(12) United States Patent
Martin Hernández et al.

(10) Patent No.: US 10,718,399 B2
(45) Date of Patent: Jul. 21, 2020

(54) ANTI-VIBRATION SUPPORT SYSTEM

(71) Applicant: TEJASA-TC, S.L.L., El Astillero (ES)

(72) Inventors: Juan José Martin Hernández, El Astillero (ES); Mahjoub Abdelatif, El Astillero (ES)

(73) Assignee: TEJASA-TC, S.L.L., El Astillero (ES)

( * ) Notice: Subject to any disclaimer, the term of this patent is extended or adjusted under 35 U.S.C. 154(b) by 0 days.

(21) Appl. No.: 16/342,983

(22) PCT Filed: Oct. 20, 2017

(86) PCT No.: PCT/ES2017/070701
§ 371 (c)(1),
(2) Date: Apr. 18, 2019

(87) PCT Pub. No.: WO2018/073480
PCT Pub. Date: Apr. 26, 2018

(65) Prior Publication Data
US 2020/0056676 A1 Feb. 20, 2020

(30) Foreign Application Priority Data

Oct. 21, 2016 (ES) .................................. 201631359

(51) Int. Cl.
*F16F 15/02* (2006.01)
*F16F 15/04* (2006.01)
*B64C 27/00* (2006.01)
*E04H 9/02* (2006.01)
*F16F 7/00* (2006.01)

(52) U.S. Cl.
CPC ............ *F16F 15/022* (2013.01); *F16F 15/04* (2013.01); *B64C 27/001* (2013.01); *E04H 9/021* (2013.01); *F16F 7/00* (2013.01); *F25B 2500/13* (2013.01)

(58) Field of Classification Search
CPC .......... F16F 15/02; F16F 15/022; F16F 15/04; F16F 7/00; B64C 27/001; E04H 9/021; F25B 2500/13
USPC .......................... 248/638, 673, 678, 680, 674
See application file for complete search history.

(56) References Cited

U.S. PATENT DOCUMENTS

| | | | |
|---|---|---|---|
| 2,900,157 A | 8/1959 | Regis | |
| 2,912,212 A | 11/1959 | Lowe et al. | |
| 9,261,155 B2* | 2/2016 | Platus | F16F 3/02 |
| 9,689,173 B2* | 6/2017 | Wu | E04H 9/021 |
| 9,939,041 B2* | 4/2018 | Kronkright | F16F 7/01 |
| 10,082,189 B2* | 9/2018 | Kronkright | F16F 15/06 |
| 10,093,450 B2* | 10/2018 | Embleton | B65D 19/42 |

(Continued)

FOREIGN PATENT DOCUMENTS

JP 2013199962 A 10/2013

*Primary Examiner* — Nkeisha Smith
(74) *Attorney, Agent, or Firm* — Soroker Agmon Nordman

(57) ABSTRACT

Anti-vibration support system; applicable in the protection of various apparatuses (E) against seismic movements and vibrations of any kind, comprising: —a lower base consisting of a floating mount (1), forming a resting surface for the apparatus (E) to be protected, and of a fixed mount (2), —an upper base (3) intended to rest on the apparatus (E) to be protected and —side structures (4a, 4b) comprising at least one tilted bar (41) connected by damping elements (42) to the upper base (3) and the fixed mount (2) of the lower base; said side structures (4a, 4b) limiting the movement of the upper base (3) and the apparatus (E) to be protected, at least, in the vertical direction.

4 Claims, 3 Drawing Sheets

(56) References Cited

U.S. PATENT DOCUMENTS

| | | | |
|---|---|---|---|
| 10,167,652 B2* | 1/2019 | Nakakubo | F16F 15/04 |
| 10,323,713 B2* | 6/2019 | Chaen | F16F 15/08 |
| 2011/0017561 A1* | 1/2011 | Tanaka | E04B 1/985 |
| | | | 188/378 |
| 2011/0049775 A1* | 3/2011 | Crumley | B63B 29/02 |
| | | | 267/136 |
| 2019/0257382 A1* | 8/2019 | Arias-Acosta | F16F 7/14 |

* cited by examiner

ANTI-VIBRATION SUPPORT SYSTEM

OBJECT OF THE INVENTION

The present invention relates to an anti-vibration support system, applicable in the protection of various apparatuses and, in particular, computer equipment, electronic equipment from data-processing centres, laboratory equipment and, in general, any sensitive equipment requiring protection against seismic movements and intense vibrations of any kind.

STATE OF THE ART

Currently, various systems for protection of constructions against seismic forces which seek to isolate the construction and/or its structural elements from the surface waves that occur in an earthquake are known. These protection systems include floating floors or floating slabs of reinforced concrete, defined as an independent floor and at the same level as the rest of the concrete slab formwork; said floating floors or slabs are supported on a rigid base by elastic elements, usually helical dampers.

These floating slabs are mainly used to prevent the transmission of vibrations or noises produced by the operation of apparatuses or machines to the building or structure.

The applicant of this invention is the holder of the Spanish patent ES 2 315 182 B1 concerning a device for positioning on floating slabs and installation system thereof.

However, floating slabs of this type are not suitable for the protection of certain vibration-sensitive apparatuses, such as computer equipment, equipment from data protection centres with networked servers or hard drives for mass data storage, against seismic movements.

Generally, these apparatuses are located in cabinets or shelves, internationally called "racks", which are independent but in contact with each other at their sides, and can be arranged in the room forming one or more rows.

At present, in order to ensure the safety of these apparatuses and their sensitive components against earthquakes, it is necessary to minimise the movements and vibrations that are transmitted from the foundation to the racks that support the apparatuses to be protected; placing the apparatuses on the aforementioned floating slabs for this purpose.

However, these floating slabs do not provide adequate protection to the apparatuses positioned on them since they are designed to prevent the transmission of vibrations from the apparatuses to the building and not the other way around; moreover, these floating slabs constitute only a base for the apparatuses to be protected to rest thereon and do not provide any fastening of said apparatuses on their upper area.

This determines that, in the event of an earthquake, the apparatuses to be protected can move uncontrollably both horizontally and vertically, and can suffer significant damage and even fall sideways.

DESCRIPTION OF THE INVENTION

The object of the invention is an anti-vibration support system intended to be positioned on the ground or other resistant surface and to provide apparatuses positioned thereon with effective protection against seismic movements and vibrations of any nature.

For this, and according to the invention, the system comprises:

a lower base consisting of a floating mount forming a resting surface for the apparatus to be protected, and a fixed mount anchored to the ground or other resistant surface, an upper base intended to rest on the apparatus to be protected and, side structures that relate the fixed mount of the lower base to the upper base, limiting the movement of said upper base and of the apparatus to be protected, at least in a vertical direction.

The upper base together with the side structures provide stability to the apparatuses mounted on the floating mount, limiting their vertical movement, minimising damage thereof in the event of an earthquake, and preventing their fall or tipping sideways.

The floating mount is capable of limited movement in three perpendicular axes X, Y, Z and is supported by lower elastic elements acting for absorbing and minimising the transmission of vertical movements, and side elastic elements arranged between said floating mount and the fixed mount; said side elastic elements limiting the movement of the floating mount on the X-Y plane.

The fixed mount is anchored to the ground or other resistant surface; and limits, together with the side elastic elements, the lateral movement of the floating mount on the X-Y plane;

The side structures comprise at least one tilted bar connected by damping elements to the upper base and to the fixed mount of the lower base; said side structures limiting the movement of the upper base and the apparatus to be protected, thereby achieving the object of the invention.

These side structures may have different configurations, providing greater or lesser limitation of the movements of the upper base with respect to the lower base. In the accompanying figures, which are described below, two exemplary embodiments of the aforementioned side structures have been represented.

DESCRIPTION OF THE FIGURES

In order to complement the description that is being carried out and with the purpose of facilitating the understanding of the features of the invention, the present description is accompanied by a set of drawings wherein, by way of a non-limiting example, the following has been represented.

PREFERRED EMBODIMENT OF THE INVENTION

Figure 1:
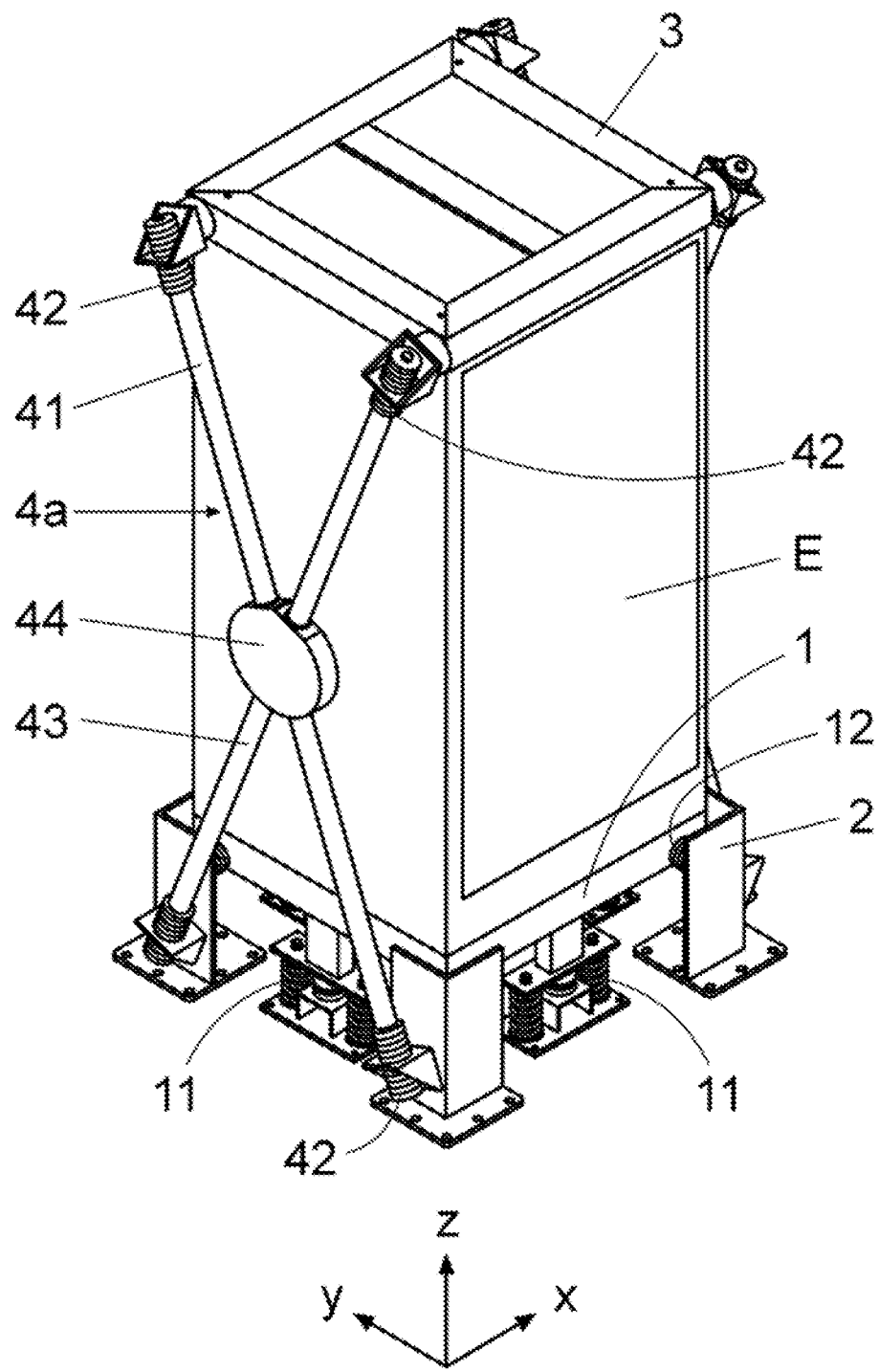
FIG. 1 shows a perspective view of an exemplary embodiment of the anti-vibration support system according to the invention, wherein the side structures have a configuration in the form of an "X".

In the exemplary embodiment shown in FIG. 1 the anti-vibration support system comprises:

a lower base consisting of a floating mount (1) and a fixed mount (2), an upper base (3) and;

side structures (4a) that relate the upper base (3) to the lower base.

The floating mount (1) forms a resting surface for the apparatus (E) to be protected with possibility of limited movement on three perpendicular axes X, Y, Z.

Said floating mount (1) is supported by lower elastic elements (11) and by side elastic elements (12) arranged between the floating mount (1) and the fixed mount (2). In the example shown, the lower (11) and side (12) elastic elements comprise springs.

On the other hand, the fixed mount (2) is anchored to the ground or other resistant surface, and together with the side elastic elements (12) acts for limiting the lateral movement of the floating mount (1) on the X-Y plane.

The upper base (3) is intended to rest on the apparatus (E) to be protected, and to limit its movement in the vertical direction, preventing it from being released from the floating mount (1) in the event that the support is subjected to strong vibrations, for example, due to an earthquake.

In the exemplary embodiment shown in FIG. 1, the system comprises, on two opposite sides, two side structures (4a) that relate the upper base (3) to the fixed mount (2) of the lower base.

Each of the side structures (4a) comprises two tilted bars (41, 43), in the form of an "X", joined together by their intermediate area (44), and attached, at the opposite ends, to the fixed mount (2) and the upper base (3) by damping elements (42).

These side structures (4a) limit the movement of the upper base (3) and the apparatus (E) to be protected in a vertical direction, and also collaborate in limiting its lateral movement.

In said FIG. 1, the apparatus (E) to be protected is computer equipment that has been schematically represented.

Figure 2:
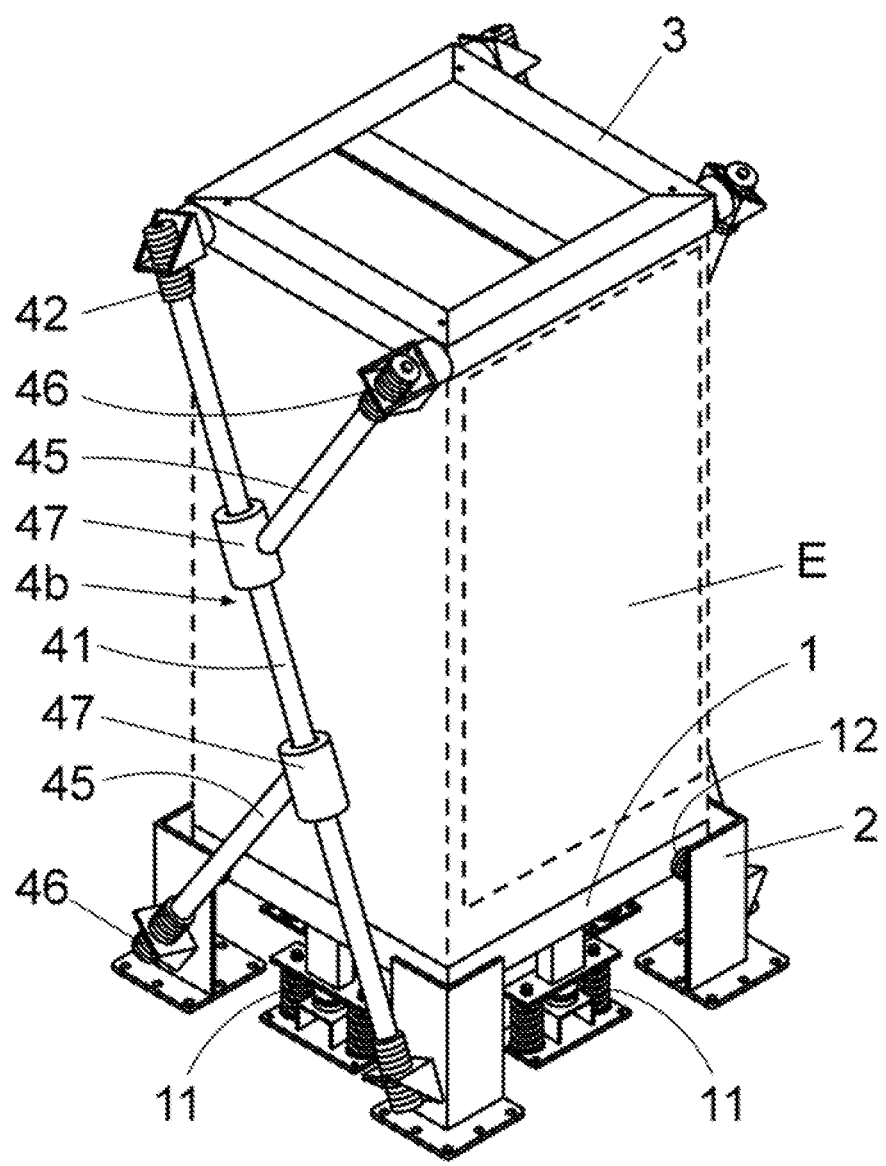
FIG. 2 shows an embodiment variant of the anti-vibration support system, according to the invention, wherein the side structures comprise a tilted bar and two auxiliary bars that together with said tilted bar form two configurations in the form of a "Y" in the proximity of the upper and lower bases.
Figure 3:
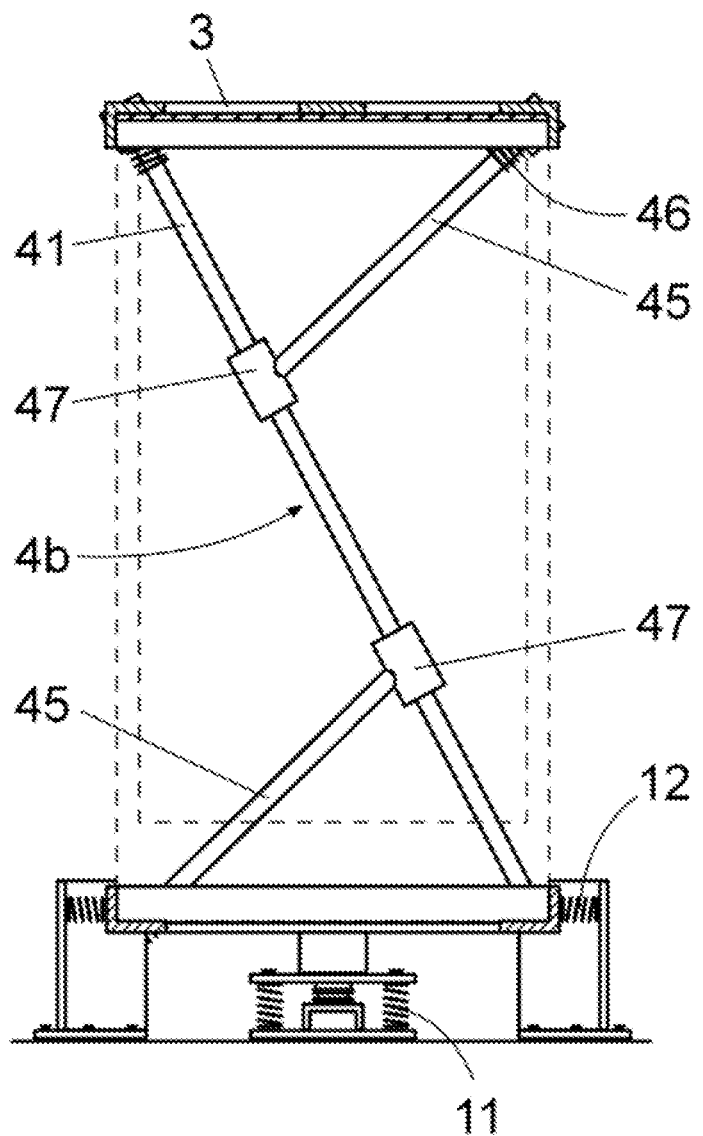
FIG. 3 shows an elevation view of the anti-vibration support system of FIG. 2. sectioned by a vertical plane.

In the embodiment shown in FIGS. 2 and 3, the system comprises two side structures (4b) arranged on two opposite sides of the system.

Each of the side structures (4b) comprises: a tilted bar (41) joined at its ends to the fixed mount (2) and to the upper base (3) by damping elements (42); and two auxiliary bars (45) joined respectively, at one end, to the fixed mount (2) and to the upper base (3) by damping elements (46); said auxiliary bars (45) having, at their opposite ends, two ferrules (47) mounted with the possibility of movement on the tilted bar (41).

Each of the auxiliary bars (45) defines with the tilted bar (41) a configuration in the form of a "Y" that allows a certain relative mobility of the upper base (3), limiting its vertical movement, but without reaching the rigidity of the side structure (4a) of FIG. 1.

As shown in said FIG. 3, in the rest position, the tilted bar (41) and the auxiliary bars (45) of a same side structure 4b are arranged in a coplanar manner.

Once the nature of the invention as well as an example of preferred embodiment have been sufficiently described, it is stated for all pertinent purposes that the materials, form, size and arrangement of the elements described are susceptible to changes, provided these do not involve an alteration of the essential characteristics of the invention that are claimed subsequently.

The invention claimed is:

1. Anti-vibration support system; applicable in a protection of various apparatuses (E) against seismic movements and vibrations, which is characterized in that it comprises:
   a lower base, consisting of:
      a floating mount (1), forms a resting surface for an apparatus (E) to be protected; said floating mount (1) being capable of limited movement on three perpendicular axes (X, Y, Z), and supported by lower elastic elements (11) and by side elastic elements (12) arranged between said floating mount (1) and a fixed mount (2);
      the fixed mount (2) anchored to ground or other resistant surface and limiting, together with the side elastic elements (12), a lateral movement of the floating mount (1) on an X-Y plane;
      an upper base (3) intended to rest on the apparatus (E) to be protected and
   a first side structure (4a) and a second side structure (4b) comprising at least one tilted bar (41) connected by damping elements (42) to the upper base (3) and to the fixed mount (2) of the lower base; said first side structure (4a) and said second side structure (4b) limiting a movement of the upper base (3) and the apparatus (E) to be protected, at least, in a vertical direction.

2. The system according to claim 1, characterized in that the first side structure (4a) comprises two tilted bars (41, 43), in a form of an "X", joined together by their intermediate area (44), and attached, at their opposite ends, to the fixed mount (2) and the upper base (3) by the damping elements (42).

3. The system according to claim 1, characterized in that each of the second side structure (4b) comprises two auxiliary bars (45) attached, respectively, at one end to the fixed mount (2) and to the upper base (3) by damping elements (46); said auxiliary bars (45) having, at their opposite ends, two ferrules (47) mounted with a possibility of movement on a tilted bar (41); forming each of the auxiliary bars (45) with the tilted bar (41) a configuration in a form of a "Y".

4. The system according to claim 3, characterized in that the tilted bar (41) and the auxiliary bars (45) of the second side structure (4b) are arranged in a coplanar manner.

* * * * *